May 12, 1970     G. W. KENNERLY ET AL     3,511,612

CHEMILUMINESCENT SYSTEMS

Filed March 20, 1967     6 Sheets-Sheet 1

INVENTORS
GEORGE W. KENNERLY
MICHAEL M. RAUHUT
BY Charles J. Fickey
ATTORNEY

May 12, 1970  G. W. KENNERLY ET AL  3,511,612
CHEMILUMINESCENT SYSTEMS

Filed March 20, 1967  6 Sheets-Sheet 2

INVENTORS
GEORGE W. KENNERLY
MICHAEL M. RAUHUT
BY
Charles J. Fickey
ATTORNEY

May 12, 1970  G. W. KENNERLY ET AL  3,511,612
CHEMILUMINESCENT SYSTEMS
Filed March 20, 1967  6 Sheets-Sheet 3
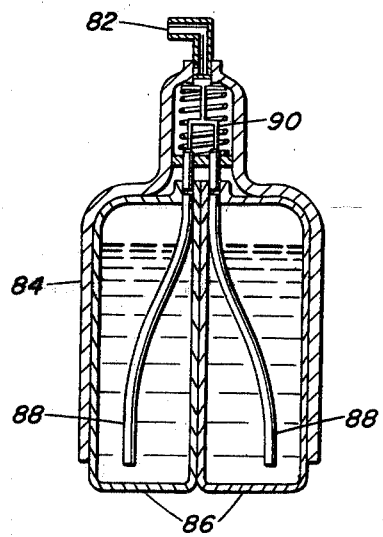
FIG. 9
FIG. 11
FIG. 12
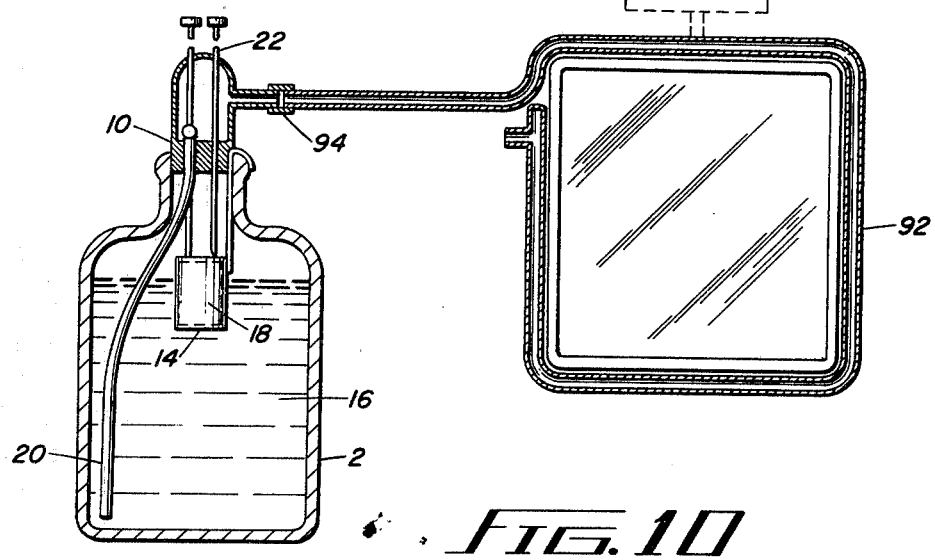
FIG. 10
INVENTORS
GEORGE W. KENNERLY
MICHAEL M. RAUHUT
BY
Charles J. Fickey
ATTORNEY May 12, 1970   G. W. KENNERLY ET AL   3,511,612
CHEMILUMINESCENT SYSTEMS
Filed March 20, 1967   6 Sheets-Sheet 4
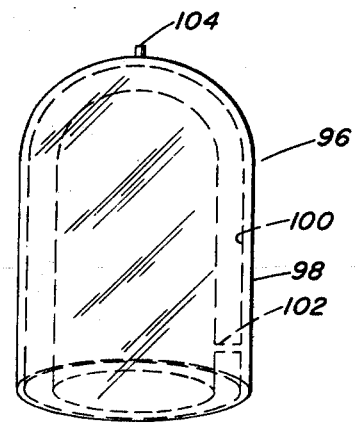
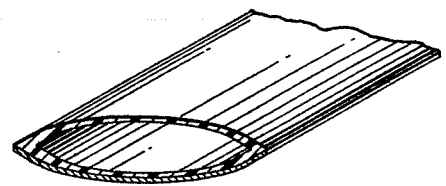
FIG.13   FIG.15
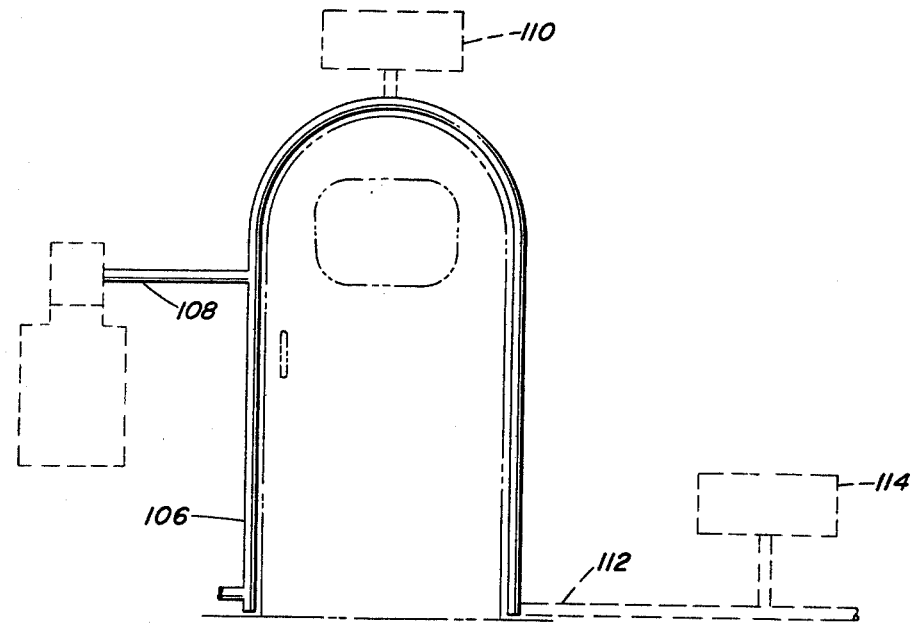
FIG.14
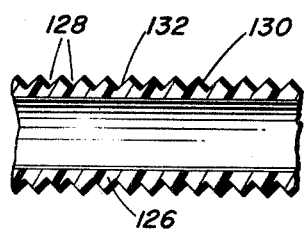
FIG.18
INVENTORS
GEORGE W. KENNERLY
MICHAEL M. RAUHUT
BY
Charles J. Tickney
ATTORNEY May 12, 1970     G. W. KENNERLY ET AL     3,511,612
CHEMILUMINESCENT SYSTEMS
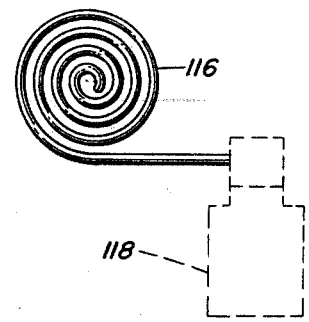
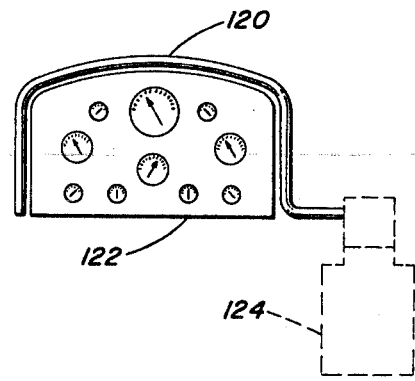
FIG. 16         FIG. 17
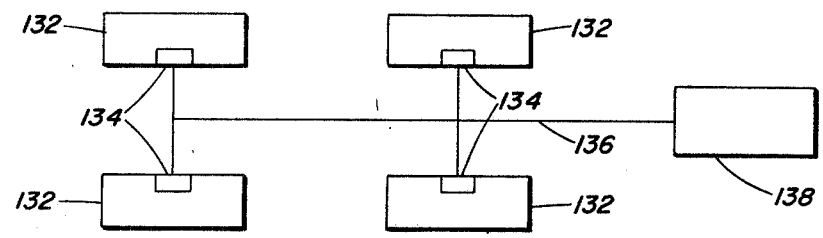
FIG. 19
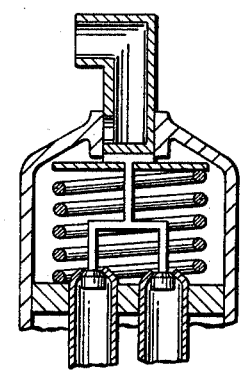
FIG. 20
INVENTORS
GEORGE W. KENNERLY
MICHAEL M. RAUHUT
BY
Charles J. Fickey
ATTORNEY May 12, 1970  G. W. KENNERLY ET AL  3,511,612
CHEMILUMINESCENT SYSTEMS
Filed March 20, 1967  6 Sheets-Sheet 6

INVENTORS
GEORGE W. KENNERLY
MICHAEL M. RAUHUT
BY
Charles J. Fickey
ATTORNEY

United States Patent Office 3,511,612
Patented May 12, 1970

3,511,612
CHEMILUMINESCENT SYSTEMS
George Warren Kennerly, Darien, and Michael McKay Rauhut, Norwalk, Conn., assignors to American Cyanamid Company, Stamford, Conn., a corporation of Maine
Filed Mar. 20, 1967, Ser. No. 624,275
Int. Cl. B01l 1/00
U.S. Cl. 23—252　　　　　9 Claims

ABSTRACT OF THE DISCLOSURE

Systems and devices for providing chemiluminescent light from a chemical reaction of suitable compounds in the presence of a fluorescent compound, and means to display said chemiluminescent light.

---

This invention relates to systems and devices for providing chemiluminescent light incorporating chemical components which react chemically and provide excitation for a fluorescent compound. The invention more particularly relates to systems and devices whereby the reactive components are maintained in a nonreactive condition until light is desired, the systems incorporating means to bring said components into a reactive condition and means to display the resultant light.

Under certain circumstances, it is desirable to have a source of visible light which is not electrically activated. Light can be provided by chemical systems, wherein the luminosity is solely the result of chemical reaction without provision of any electrical energy. Such light is known as chemiluminescent light.

Chemiluminescent light may be useful where there is no source of electricity. For example, in emergencies where sources of electrical power have failed, a chemiluminescent system could provide light. Such emergencies could occur in a crash landing of an aircraft, a power failure in a submarine or in underground installations or during any electrical power failure. Moreover, chemiluminescent light is cold light and can be used where the heat of conventional illumination is not desired. It is also useful where electrical means could cause a fire hazard, such as in the presence of inflammable agents. Chemiluminescent light is also effective under water since there are no electrical connections to short out. Thus it may be seen that chemiluminescent light can have many useful applications.

A principal object of the present invention is to provide systems and devices incorporating chemiluminescent components for the provision of chemiluminescent light.

A further object of this invention is to provide means for containing chemically reactive chemiluminescent components in a non-reactive condition and means to combine said components when desired to provide chemiluminescent light.

Another object of the invention is to provide chemilumnescent lighting systems and devices having light display means.

These and other objects of the invention will become apparent as the description thereof proceeds.

The chemiluminescent system of this invention comprises (1) a device accommodating the admixture of at least two chemiluminescent components and providing for the expulsion of the resulting mixture from the device and (2) at least two chemiluminescent components comprising either (a) a component containing a chemiluminescent compound and a second component containing a hydroperoxide compound or (b) a solid component containing both a solid chemiluminescent compound and a solid hydroperoxide compound and a second component comprising a solvent for said solid chemiluminescent compound and said solid hydroperoxide compound. Any other necessary ingredients for the production of chemiluminescent light, or for lifetime control, or for intensity improvement, or for storage stabilization must of course either be included in one of the two system components or included as additional components. In particular with the preferred oxalic-type chemiluminescent compounds of this invention, a fluorescent compound must be included in the system.

The preferred chemiluminescent light is obtained in this invention by the reaction of a hydroperoxide with a chemiluminescent composition which, in combination, comprises a chemiluminescent compound selected from the group consisting of (1) an oxalic-type anhydride of the type disclosed and claimed in U.S. Pat. No. 3,399,137, issued Aug. 27, 1968 which is hereby incorporated by reference, (2) an oxalic-type amide of the type disclosed and claimed U.S. Pat. No. 3,442,815, issued May 6, 1969, and copending application Ser. No. 547,782, both of which are hereby incorporated by reference, (3) an oxalic-type O-acyl-hydroxylamine of the type disclosed and claimed in copending application, Ser. No. 547,761, and (4) an oxalic-type ester in application, Ser. No. 491,896, abandoned Nov. 14, 1966, and refiled as continuation-in-part application Ser. No. 619,140, in the presence of a fluorescer compound, and a solvent. Other suitable chemiluminescent compounds are 3-aminophthalhydrazide, 3,4,5-triphenylimidazole, 10,10'-dialkyl-9,9'-biacridinium salts, and 9-chlorocarbonyl-10-methylacridinium chloride. The latter is disclosed and claimed in U.S. Pat. No. 3,352,791, issued Nov. 14, 1967. All of the foregoing provide chemiluminescence when reacted with a hydroperoxide compound in the presence of a base. Other chemiluminescent materials are described by K.D. Gunderman, Angew. Chemie, Int. ed., 4, 566/1965.

The preferred chemiluminescent compound of this invention is an oxalic-type ester selected from the group consisting of (a) an ester of an oxalic-type acid and an alcohol characterized by acid ionization constant in water greater than $1.3 \times 10^{-10}$, and (b) a vinyl ester of an oxalic-type ester. Similarly, in a preferred embodiment thereof, the alcohol would be an aromatic alcohol substituted by a substituent characterized by a positive Hammett sigma value. The preferred species of oxalic-type esters include bis(substituted-phenyl)oxalate such as bis (2 - nitrophenyl)oxalate, bis(2,4 - dinitrophenyl)oxalate, bis(2,4-dinitrophenyl)oxalate, bis(2,6-dichloro - 4 - nitrophenyl)oxalate, bis(3-trifluoromethyl-4-nitrophenyl)oxalate, bis(2-methyl-4,6-dinitrophenyl)oxalate, bis(1,2-dimethyl-4,6-dinitrophenyl)oxalate, bis(2,4-dichlorophenyl) oxalate, bis(2,5 - dinitrophenyl)oxalate, bis(2 - formyl-4-nitrophenyl)oxalate, bis(pentachlorophenyl)oxalate, bis (1,2-dihydro-2-oxo-1-pyridyl)-glyoxal, bis-N-phthalmidyl oxalate. The preferred sub-species is bis(pentachlorophenyl)oxalate.

The peroxides employed in the components of this invention may be any hydroperoxide compound. Typical hydroperoxides include t-butylhydroperoxide, peroxybenzoic acid, and hydrogen peroxide. Hydrogen peroxide is the preferred hydroperoxide and may be employed as a solution of hydrogen peroxide in a solvent or as an anhydrous hydrogen peroxide compound such as perhydrate of urea (urea peroxide), perhydrate of pyrophosphate (sodium pyrophosphate peroxide), perhydrate of histidine (histidine peroxide), sodium perborate, sodium peroxide, and the like. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-2}$ molar. The ester of this invention may be added as a solid or in admixture with a suitable solid peroxide reactant or in a suitable diluent, or alternatively dissolved directly in a solution containing the peroxide reactant.

Typical diluents, which additionally may be used in conjunction with the necessary diluent of this invention, are those which do not readily react with a peroxide such as hydrogen peroxide, and which do not react with an ester of oxalic acid.

Where a solvent is employed with the hydroperoxide-containing component of this invention said solvent can be any fluid which is unreactive toward the hydroperoxide and which accommodates a solubility of at least 0.01 M hydroperoxide. Typical solvents for the hydroperoxide component include water; alcohols, such as ethanol or octanol; ethers, such as diethyl ether, diamyl ether, tetrahydrofuran, dioxane, dibutyldiethyleneglycol, perfluoropropyl ether, and 1,2-dimethoxyethane; and esters, such as ethyl acetate, ethyl benzoate, dimethyl phthalate, dioctylphthalate, propyl formate. Solvent combinations can, of course, be used such as concentrations of the above with aromatic anisole, tetralin, and polychlorobiphenyls, providing said solvent combination accommodates hydroperoxide solubility. However, when oxalic-type chemiluminescent materials are used, strong electron donor solvents such as dimethyl formamide, dimethyl sulfonide, and hexamethylphosphoramide should not, in general, be used as a major solvent component.

Where a solvent is employed with the component containing the chemiluminescent material any fluid can be used providing said fluid solubilizes at least 0.01 M concentration of the chemiluminescent material and is unreactive toward the chemiluminescent material. Typical solvents include ethers, esters, aromatic hydrocarbons, chlorinated aliphatic and aromatic hydrocarbons, such as those cited in the preceding paragraph. For oxalic-type chemiluminescent compounds, hydroxylic solvents such as water or alcohols and basic solvents such as pyridine should not be employed since such solvents used in general, react with and destroy oxalic-type chemiluminescent compounds. Solvent combinations may, of course, be used but such combinations when used with oxalic-type chemiluminescent compounds should not include strong electron donor solvents.

When a component comprising a solid chemiluminescent compound and a solid hydroperoxide is used, the solvent or solvent composition comprising the second component may vary broadly. Said solvent, however, should preferably dissolve at least 0.002 M concentrations of both, the hydroperoxide and the chemiluminescent compound, and for oxalic-type chemiluminescent compounds, strong electron donor solvents should be avoided as major solvent components.

The fluorescent compounds contemplated herein are numerous; and they may be defined broadly as those which do not readily react on contact with the peroxide employed in this invention, such as hydrogen peroxide; likewise, they do not readily react on contact with the chemiluminescent compound.

A fluorescent compound is required for light emission when the prepared oxalic-type chemiluminescent compound of the invention is employed. For other types of chemiluminescent compounds a fluorescer is not required but may be used to shift the wavelength of emitted light toward the red region of the spectrum so as to change the color of emitted light. Fluorescent compounds for use with oxalic-type chemiluminescent compounds should be soluble in the reactive solvent at least to the extent of 0.0001 moles per liter.

Typical suitable fluorescent compounds for use in the present invention are those which have a spectral emission falling between 330 millimicrons and 1000 millimicrons and which are at least partially soluble in any of the above diluents, if such diluent is employed. Among these are the conjugated polycyclic aromatic compounds having at least 3 fused rings, such as anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc., New York, N.Y., 1949. Other fluorescers are described in "The Colour Index," second edition, volume 2, The American Association of Textile Chemists and Colorists, 1956, pp. 2907–2923. While only typical fluorescent compounds are listed hereinabove, the person skilled in the art is fully aware of the fact that his invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, a fluorescent oxalic-type ester, such as the oxalic acid ester of 2-naphthol-3,6,8-trisulfonic acid, does not require a separate fluorescent compound to obtain light. Other typical fluorescent oxalic acid esters include esters of oxalic acid (1) 2-carboxyphenol, (2) 2-carboxy-6-hydroxyphenol, (3) 1,4 - dihydroxy-9,10-diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The ester of oxalic acid molar concentration normally is in the range of at least about $10^{-4}$ to 5 molar, preferably in the range of at least about $10^{-3}$ to about 1 molar; the fluorescent compound is present in the range from about $10^{-5}$ to 5, preferably $10^{-4}$ to $10^{-1}$ molar; and the diluent must be present in a sufficient amount to form at least a partial solution of the reactants involved in the chemiluminescent reaction. If the ester is liquid, it may serve as either the sole diluent or a partial diluent.

The ingredients of the composition of this invention may be admixed in a single stage of admixing or in a sequence of steps of admixing the separate ingredients.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Additionally, it has been found that the superior intensity of chemiluminescence is obtained when the final mixture producing the luminescence is maintained at a temperature of between about $-40°$ C. and $75°$ C., preferably between about $20°$ C. and $50°$ C. However, temperature is not critical and the luminescence of applicants' process is not limited to these ranges.

The lifetime and the intensity of the chemiluminescent light obtained with the preferred oxalic-type chemiluminescent compounds of this invention can be regulated by the use of certain regulators such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of regulation.

(3) By the addition of water.

(4) By the addition of a catalyst which changes the rate of reaction of hydroperoxide with the oxalic-type ester. Catalysts which accomplish that objective include those described in M. L. Bender, "Chem. Revs.," vol. 60, p. 53 (1960). Also, catalysts which alter the rate of reaction or the rate of chemiluminescence include those accelerators of application, Ser. No. 577,595, now abandoned, refiled Oct. 13, 1967 as continuation-in-part application Ser. No. 675,141 and decelerators of application, Ser. No. 577,615 abandoned Sept. 13, 1967, refiled June 26, 1967 as continuation-in-part application Ser. No. 648,932.

While acids are not in general accelerators for oxalic-type chemiluminescent reactions it should be noted specifically that acids are accelerators for the oxalic amide chemiluminescent compounds of copending application, Ser. No. 547,782.

More specifically, the advantages obtained by the corporation of a catalyst of Ser. No. 675,141 may be obtained in conjunction with the objects of this present invention, by employing, according to the copending application, an ionized salt having a cation selected from (a) an organic quaternary cation selected from the group consisting of ammonium, arsenic, and phosphorous, and (b) alkali metal having an atomic weight above 22, the salt of said cation preferably being soluble in an organic solvent and preferably being characterized by a property of forming cation-aggregates when reacted with the oxalic-type ester and a hydroperoxide. One of the advantages is the fact that an excessive amount of the chemiluminescent agent may be employed whereby a higher quantum yield may be obtained when the ionized salt is employed, in contrast to systems not employing the accelerator whereby such systems would be limited to a much lower maximum concentration of chemiluminescent agent which would continue to increase rather than decrease the total quantum yield of chemiluminescent light.

Similarly, within the scope of the present invention is the concurrent employment of one or more decelerators either alone in the composition of this invention, or in conjunction with one or more of the accelerators discussed in the preceding paragraphs. By employing one of the accelerators of the preceding paragraph, it would be possible to employ a greater total concentration of the chemiluminescent agent while concurrently would be possible to employ a decelerator which would prolong the period during which the light of high intensity is obtained from the chemiluminescent reaction. Such decelerators set forth in the copending application, Ser. No. 648,932, include for example a compound such as oxalic acid.

When oxalate-type chemiluminescent compounds are used in a solution component it may be desirable to include a stabilizing agent such as those described in copending application, Ser. No. 614,397.

The chemical compounds, components and their reactions for providing chemiluminescent light are described in U.S. Pat. Nos. 3,329,621 and 3,425,949 and those references previously mentioned, and as such they do not form a part of the present invention.

In this invention, the reactive components are stored in a multiple compartment container device having means to bring the separate components into contact to produce the reaction which provides chemiluminescent light, and means to dispense the fluid from said container. A minimum of two compartments is required. When either the chemiluminescent compounds, hydroperoxide, or both are fluid, they must be in separate compartments. The diluent and fluorescent compounds can be in either of these two compartments. If the chemiluminescent compounds, hydroperoxide and fluorescent compounds are dry powdered solids, they may be kept together in one compartment with the diluent in the other compartment. Means is provided to bring the components in each compartment together and to dispense the combined components as a chemiluminescent light mixture. The light mixture may be dispensed directly from the container onto any surface thus providing visible light. Alternatively, the light mixture may be dispensed into a transparent or translucent container of any desired configuration to provide visible light in various display forms.

The invention may be better understood by reference to the drawings in which FIG. 1 shows one embodiment of the chemiluminescent light dispensing device.

FIGS. 2 to 9, and 21 to 23 show alternative embodiments of the chemiluminescent light dispensing device.

FIGS. 10 to 18 show various embodiments of a light display means used with the chemiluminescent light dispensing means of FIGS. 1 to 9, and 21 to 23.

FIG. 19 shows a system composed of a number of chemiluminescent light dispensing and display stations and means to activate all of said stations.

Figure 1:
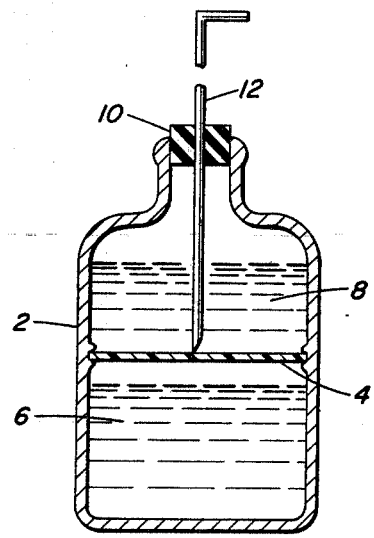

FIG. 20 discloses one embodiment of a dispensing nozzle.

In the various embodiments of dispensing devices shown in the figures, two basic systems are represented. These are: (1) a device having reactive components in separate compartments and means to combine the compartments into one of the compartments such as by removing the dividing partition whereby the components are admixed and react to produce a luminous mixture in the container which may be dispensed to provide visible light; and (2) a device having reactive components in separate compartments which are dispensed simultaneously into a mixing chamber or nozzle whereby a luminous mixture is produced by the reaction, and the luminous mixture is dispensed to provide visible light.

Referring to the drawings, FIGS. 1 to 5 show various embodiments where the reactants are premixed before dispensing, and the luminous composition is dispensed from the container to provide chemiluminescent light.

In FIG. 1, a container 2 is represented schematically and has a horizontal partition 4 which forms separate compartments 6 and 8. The outlet of compartment 8 is closed by seal 10 enclosing a dispensing nozzle 12 having a closing valve, not shown. The reactive chemiluminescent components are separately stored in compartments 6 and 8.

For example, when fluid components are used, the chemiluminescent compound can be in compartment 6 and the hydroperoxide component can be in compartment 8. The fluorescent compound and diluent may be in either compartment, since it is only necessary that the chemiluminescent compound and hydroperoxide compound be separated. It will be obvious, of course, that the components could be located conversely, i.e., that the hydroperoxide could be in compartment 6 and the chemiluminescent compound in compartment 8. When it is desired to provide chemiluminescent light, partition 4 is ruptured by any suitable means such as dip tube 12 and the components of compartments 6 and 8 are admixed and become a chemiluminescent mixture. The chemiluminescent mixture may be dispensed by opening a valve (not shown) in dispensing tube 12 and pouring out the mixture. The mixture could also be dispensed automatically by incorporating an inert gas under pressure in either compartment 6 or 8, preferably compartment 8. Since it has been found in copending application, Ser. No. 614,397, that weak acids act as storage stabilizer for the chemiluminescent compounds, a particularly advantageous embodiment is to store the chemiluminescent compound in compartment 8 together with carbon dioxide, where the carbon dioxide can act as a stabilizer and as a propellant gas.

Figure 2:
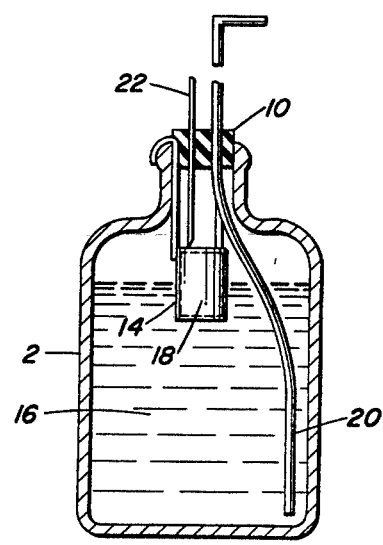

In FIG. 2, the dispensing device has an outer container 2, as in FIG. 1. A separate inner container 14 is secured within container 2. Thus two compartments 16 and 18 are provided for the reactive components. Container 2 has a seal 10 and a dip tube 20. Inner container 14 is entirely closed and is a rupturable material, or has a rupturable closure. The contents of container 14 are admixed with that of container 2 by means of a pull or push device 22 which is operated from outside the dispenser. Device 22 can be any suitable pull cord or push rod. When container 14 is ruptured, the reactants are admixed and a fluid chemiluminescent composition results which is dispensed through dip leg 20, by an inert gas under pressure if desired contained in outer container 2.

Figure 3:
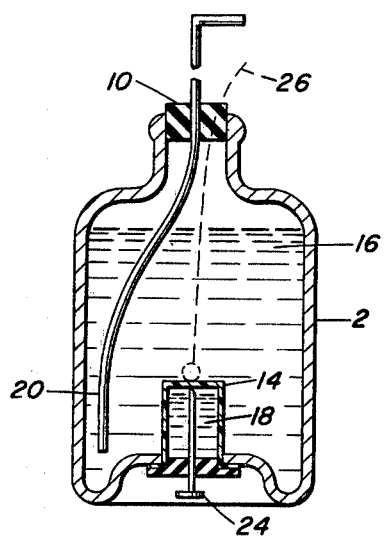

Inner container 14 may be located adjacent to the bottom of container 2 as shown in FIG. 3. In this embodiment, a plunger 24 may be provided which is operated externally of container 2 to rupture container 14. Alternatively, a pull cord or other pull means 26 may be used to rupture container 14. It is possible to change plunger 24 to be a pull device. The admixed chemiluminescent composition is dispensed through dip leg 20 as in FIG. 2.

Figure 4:
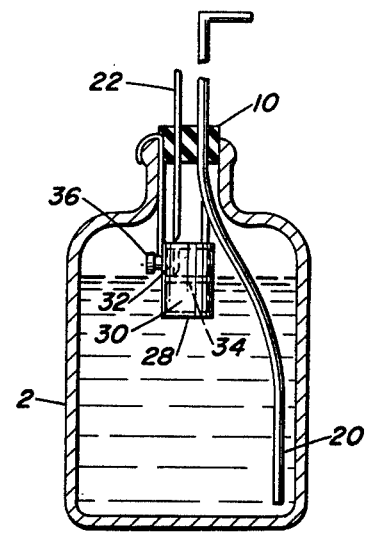

The inner container 14 may also be a multiple compartment container as shown by inner container 28 of FIG. 4 having compartments 30 and 32 formed by divider 34. In such an embodiment, compartment 30 could contain a compressed gas, while compartment 32 contains one of the reactants. A push or pull device is used to rupture the divider 34. Compartment 34 is closed by a pressure rupturable seal 36 which is capable of being ruptured by the gas pressure in the container after rupture of divider 34. Thus the contents of inner container 28 will be forced out and mixed thoroughly with the reactant in outer container 2 to form the chemiluminescent composition which may be dispensed through dip leg 20 under the gas pressure.

Figure 5:
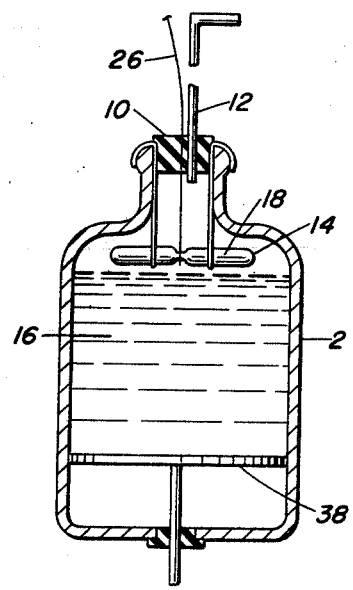

FIG. 5 shows an embodiment similar to that of FIG. 2 except that expelling of the admixed contents is by means of a piston 38 which could be either mechanically or gas operated.

In the devices shown in FIGS. 1 to 5, the total reactants are admixed at one time and dispensed immediately in toto or shortly after mixing since the lifetime of the illumination begins at the time of admixing. Thus the entire contents will generally be used more or less in a one-shot application.

In FIGS. 6 to 9, the dispensing devices have multiple compartments from which reactants are dispensed simultaneously into a common mixing chamber where the chemiluminescent composition is formed and is further dispensed from a single nozzle.

Figure 6:
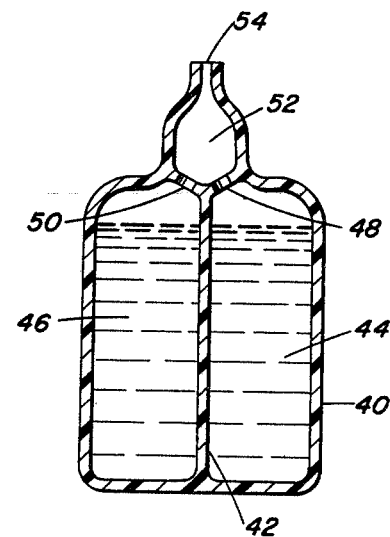

FIG. 6 shows an outer container 40 which is a flexible material, for example of a suitable plastic such as polyethylene or Teflon, having a divider 42 forming compartments 44 and 46. Compartments 44 and 46 have outlets 48 and 50, respectively, which may be one way pressure operated valves of any suitable type to permit dispensing only from the compartments, but which do not permit flow back into the compartments. By external pressure on the container 40, the separate reactants in compartments 44 and 46 are dispensed into mixing chamber 52 where the chemiluminescent composition is formed and further dispensed from nozzle 54. Any suitable closure, not shown, may be used to close nozzle 54 when the device is not in use. With the use of a mixing chamber, only as much of the reactants need be used as is desired at a particular time. If desired, the components may be kept in disposable containers which fit into the compartments and open to the discharge outlets.

Figure 7:
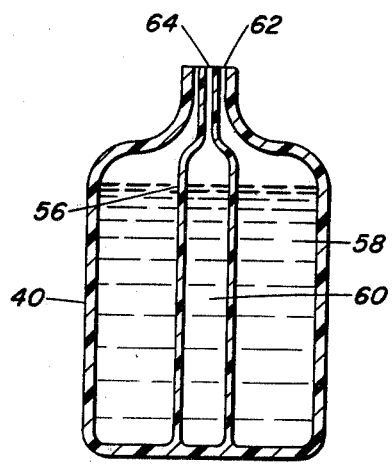

The compartments may be concentric as shown in FIG. 7. A flexible inner container 56 is positioned within a flexible outer container 40 similar to that of FIG. 6, to form compartments 58 and 60, having concentric outlets 62 and 64, respectively. In this embodiment, the dispensing nozzles 52 and 54 are concentric and the mixing of components takes place as they are discharged from the nozzles. The operation of the embodiment of FIG. 7 is substantially the same as that of FIG. 6, in that it operates by external pressure on the walls of container 40. As an alternative, inner container 56 could be made closed and rupturable by pressure on walls 40 to admix the components and dispense by squeeze action.

Figure 8:
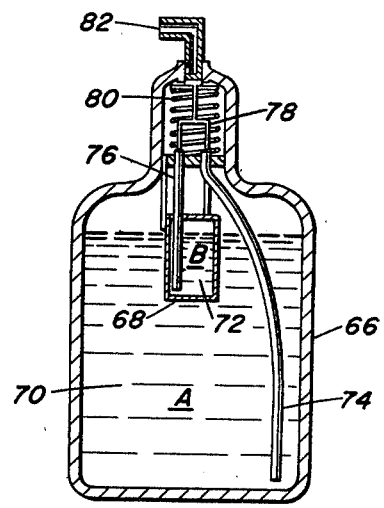

In FIG. 8 is shown an embodiment having multiple compartments with dispensing from each where the dispensing is under a compressed gas drive. There is an outer container 66 and an inner container 68, forming compartments 70 and 72, respectively. Compartment 70 has a dip tube 74 and compartment 72 has a dip tube 76, both dip legs being closed by a valve system 78 of a suitable construction such as shown in FIG. 20, for example. Dip tubes 74 and 76 open into a mixing compartment 80 leading to a dispensing nozzle 82. A reactant A is contained in compartment 70 together with an inert propellant gas, and a reactant B is contained in compartment 72, also with a propellant gas. In operation, actuation of valve system 78 permits flow of the reactants from each compartment where they are admixed in chamber 80 to form the chemiluminescent composition which is dispensed as a luminous mixture from nozzle 82. Valve 78 may be opened or closed as desired, so that any desired amount of chemiluminescent composition may be dispensed. The amount of reactants not dispensed of course remain in unreacted form in compartments 70 and 72. This embodiment has great flexibility since it is automatic in operation and permits use of some or all of the chemiluminescent composition at any given time. Moreover, it permits the dispensing of a small amount of chemiluminescent composition at intervals to test the activity of the reactants where the system involves storage over an extended period of time. It will be understood of course, that valve 78 can be designed so that it may be caused to remain open when it is desired to dispense the entire contents at one time.

The separate containers may be completely separate as shown in FIG. 9. In this embodiment, an outer case 84 contains two separate containers 86, each with a dip tube 88. The dip tubes are detachably connected to tubes 91 which are a part of a valve system 90. In each container 86 is one of the reactants for the chemiluminescent composition. When valve 90 is actuated, the operation is similar to that of the embodiment of FIG. 8, with the reactants being admixed in chamber 80 and dispensed through nozzle 82.

This embodiment has an advantage in that containers 86 can be replaced when empty or the reactants are inactive due to age, without the need for taking the entire device for refilling.

It will be obvious that various combinations of the embodiments shown in FIGS. 1 to 9 may be made, so long as the essential features of the invention are provided, i.e. the means to contain the chemiluminescent components in a condition where they do not react, means to admix the components to cause them to react and form a chemiluminescent composition which is a light emitting fluid, and means to dispense the luminous fluid.

A further feature of the invention is the provision of a receptacle for receiving the chemiluminescent light emitting composition. The receptacle is a transparent or translucent material which transmits visible light. It may be, for example, glass, various plastics such as polyethylene, polypropylene, polymethylmethacrylate, Teflon, polystyrene, and the like. The receptacle may be of any desired configuration suitable to provide light for any desired purpose, as shown in FIGS. 10 to 18.

In FIG. 10, the receptacle is an elongated tube 92 attached at 94 to the outlet nozzle of a dispensing device similar to that shown in FIG. 2 and described above. Tube 92 is bent to fit around a window, as shown, and has a vent at end 96 for the escape of air when the tube fills with chemiluminescent composition. Such a system is suitable for emergency lighting of an exit window, when conventional electric power has failed, for example in a downed aircraft. Upon activation of the dispensing means, the chemiluminescent composition is formed and dispensed into tube 92 providing a visible light surrounding the window. As shown by dotted lines, tube 92 may be connected to an indicating means such as a configurated tube or an indicia bearing receptacle to display indicia such as the word "EXIT," as shown in FIGS. 11 and 12.

As shown in FIG. 13, the receptacle could take the shape of a dome 96 having spaced apart walls 98 and 100 which is positioned over the dispenser and connected to it at 102. An air vent 104 is provided at the top. Such a device provides a large light area in proportion to the available fluid chemiluminescent composition available.

By means of a display device, such as shown in FIGS. 10 and 13, for example, a continuous lighting system can be provided by use of a chemiluminescent dispenser of the type shown in FIG. 8 or 9 and having sufficient capacity to continuously provide a steady flow of admixed chemiluminescent material to the light transmitting display device and means to continuously withdraw the spent chemiluminescent mixture from the display device. The rate of flow can be regulated in accordance with the lifetime of the particular chemiluminescent mixture. It is obvious that numerous lighting devices could be devised using this flow through system.

The embodiment of FIG. 14 is similar to that of FIG. 10, and shows a tube 106 being used to outline a door of, for example, an aircraft. The tube is connected to a chemiluminescent dispensing device at 108 and may have an indicia panel at 110. In addition, tube 106 may be connected to other tubes, for example floor runner tubes 112 shown in dotted lines which may have additional chemiluminescent dispensers, e.g. at 114.

Any or all of the tubes 106, 112 or 92 may be rigid, flexible or even a thin walled collapsible tube as shown in FIG. 15. Moreover, in the collapsible tube of FIG. 15 a reflective backing could be provided to intensify the light, and this could also be done with any of the other applications.

A further application of a flexible tube is shown in FIG. 16, where a coiled flexible tube 116 is attached at 118 to a chemiluminescent dispenser. Such an application is useful on the edges of a rolled escape chute on an aircraft for emergency use. When the chute is unrolled for use at night, the tubes on each side are filled with the chemiluminescent composition and illuminate the slide chute. The same system can be used on life rafts, life jackets or any collapsible or inflatable item.

FIG. 17 shows the use of a tube 120 for emergency illumination of an instrument panel 122 of any type by means of the chemiluminescent dispenser at 124. In the same manner, an individual instrument on a panel could be outlined and illuminated by a configurated tube.

In FIG. 18, a means for indicating direction on a lighted tube is shown. Tube 126, made of a rigid material such as Lucite, is provided with annular grooves 128. On one side 130, the grooves are provided with a fluorescent color substance so that they will appear in a different (longer wavelength) color from the visible light being emitted from the tube and visible on the other faces of the grooves. Thus when moving in the direction of the arrow, the emitted light is seen while movement in the direction shows the fluorescent color of faces 130. Thus in an emergency exit system the right and wrong exit directions could be ascertained.

The chemiluminescent systems described can be used in multiples and can be controlled from a single central point if desired. As shown in FIG. 19, a number of chemiluminescent stations 132, each having an activating device 134 are connected to an activation system comprising a signal line 136 and a remote control means 138 for operating the activating devices 134. Remote control 136 can be of various known types, and the activating devices 134 will be of a type operable by control 136. For example, control 136 may be a mechanical, manual means with signal line 136 being hydraulic, and actuators being hydraulically operated mechanical devices to activate the valves of chemiluminescent systems 132. Such a system can be used on an aircraft with control 138 being located in the pilots compartment and the chemiluminescent stations 132 being located where necessary throughout the aircraft. The system could serve as emergency lighting when needed.

Another suitable system for an aircraft is one having control 136 connected to the main electrical system in such a way that failure of the main electrical system activates all stations 132 to provide emergency lighting.

It will be obvious that other suitable systems can be designed within the scope of the invention for providing emergency lighting at a number of stations controlled by a central station.

Figure 21:
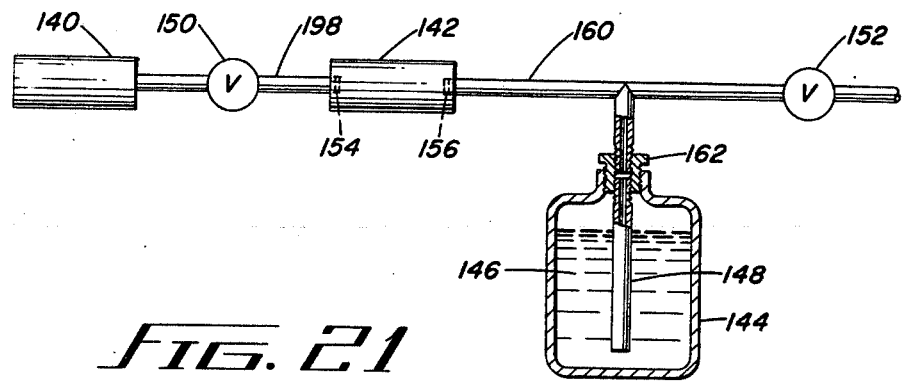
Figure 22:
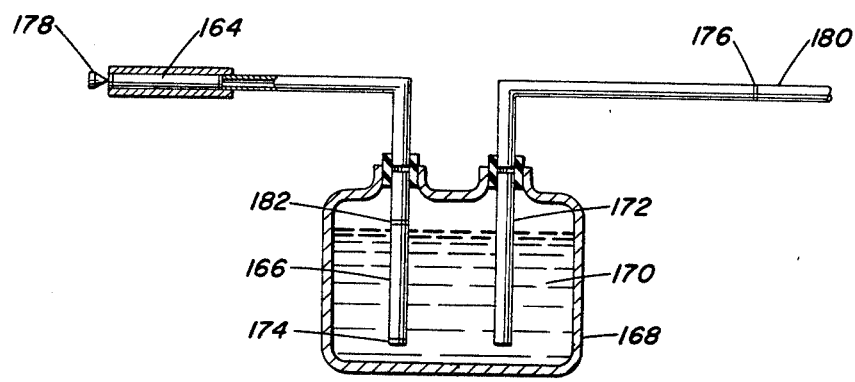

Other propulsive systems may also be used such as shown in FIGS. 21 and 22.

The device in FIG. 21 consists of a compressed gas cylinder 140, a chemiluminescent container 142, a cylinder 144 containing a second chemiluminescent component 146, a dip leg 148, two valves 150 and 152, and two gas pressure rupturable disks 154 and 156. Containers 140, 142, and 144 are easily removed from the dip leg by screw threaded connections 158, 160, and 162 so that the reaction components and gas may be replaced. On operation, valve 150 is opened first, the gas pressure breaks rupture disks 154 and 156 and forces the chemiluminescent component in 142 through the dip leg into the chemiluminescent in 144. Excess gas venting through the component in 144 will provide mixing. Valve 152 is then opened to release the chemiluminescent mixture under gas pressure.

The device in FIG. 22 consists of a typical explosive cartridge such as a blank shotgun cartridge enclosed in a barrel 164, exploded by a firing pin 178, a dip leg 166 containing a chemiluminescent component solution 182, a cylinder 168 containing a second chemiluminescent component solution 170, a second dip leg 172, and two gas pressure rupturable disks 174 and 176. The device is operated by exploding cartridge 164 by striking with firing pin 178. The gas pressure generated breaks rupture disk 174 and forces component 182 into component 170. The excess gas bubbling through 170 provides mixing. When sufficient gas pressure develops (only a few seconds is required) in cylinder 168, rupture disk 176 is broken and the chemiluminescent reaction mixture is forced through dip leg 172 through orifice 180. It is noted specifically (a) that component solution 170 only partly fills cylinder 168 so that substantial pressure does not immediately develop in cylinder 168 and break rupture disk 176 before adequate mixing has occurred; and (b) that the free gas space above the component in dip leg 166 is sufficient to moderate an excessive surge of pressure which might break rupture disk 176 prematurely. Rupture disk 176 can of course be replaced by a valve if desired. Dip leg 166 is connected to cylinder 168 by a connection so that it can be easily removed and so that chemiluminescent component 170 can be replaced.

Figure 23:
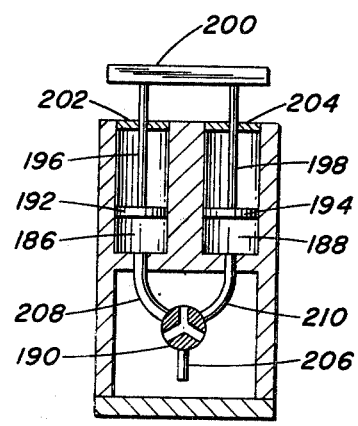

The device in FIG. 23 consists of a rectangular base 184 into which has been drilled two cylinders 186 and 188. Cylinders 186 and 188 are connected by tubes 208 and 210 to a three-way valve 190. Contained in cylinders 186 and 188 are pistons 192 and 194 which can be moved by rods 196 and 198 by pushing and pulling handle 200. Rods 196 and 198 pass through removable guides 202 and 204 to avoid excessive rod wobble. Chemiluminescent components solutions are placed separately in cylinders 186 and 188. To operate, stopcock 190 is rotated to connect tubes 208 and 210 to tube 206 and handle 200 is pushed down. The solution contained in cylinders 186 and 188 are forced into stopcock 190 where they combine and are expelled from tube 206.

The invention provides systems and devices for providing visible light whenever and wherever desired, independent of conventional electrical lighting methods and without the hazards of electrical lighting. The chemiluminescent lighting systems can be especially useful in emergency situations where all other forms of lighting have failed. The systems do not have the fire hazard of ignitable lighting devices such as candles, gas, or oil lights.

It will be readily apparent that the chemiluminescent systems are not confined to emergency lighting, however. They can be used at any time where a cold, safe illuminating means is desired. They are also useful to provide illumination where electrical illumination is unavailable. Such systems can also be made highly portable. Moreover, the applications are varied and numerous in view of the possibility of using configurated display means and the ability of the chemiluminescent composition to take such configurated forms due to its fluid state.

While certain specific embodiments and preferred modes of practice of the invention have been described, it will be understood that this is solely for illustration, and that various changes and modifications of the invention may be made without departing from the spirit of the disclosure or the scope of the appended claims.

What is claimed is:

1. A long-lived, bright chemiluminescent light system comprising a container having at least two separate compartments, a first chemiluminescent reactant comprising an oxalic-type compound in one of said compartments, a second chemiluminescent reactant in another of said compartments capable of reacting with said oxalic-type compound to produce chemiluminscent light, said second reactant comprising a hydroperoxide, means to cause at least a portion of the contents of one of said compartments to admix at least a portion of the contents of the other compartment, and means dispense a substantial amount of said reacting admixture from said container to provide light over an area.

2. The system of claim 1 comprising means to empty the component of one container into another container.

3. The system of claim 1 comprising means to convey the components of said containers into a common mixing chamber.

4. The system of claim 1 wherein at least one of said containers comprises pressurized inert gas drive means.

5. The system of claim 1 comprising in addition a light transmitting enclosure for receiving said dispensed chemiluminescent mixture.

6. The system of claim 5 wherein said light transmitting enclosure is an elongated cylinder.

7. The system of claim 5 comprising means to withdraw a part of the chemiluminescent mixture from said enclosure.

8. A chemiluminescent sysem comprising a plurality of stations comprising the system of claim 5, and a common means to activate said plurality of stations.

9. A chemiluminescent system according to claim 1 wherein said oxalate-type compound is an ester of oxalic acid and an alcohol, said alcohol being characterized by an ionization constant in water greater than $1.3 \times 10^{-10}$.

References Cited

UNITED STATES PATENTS

| | | | |
|---|---|---|---|
| 2,420,286 | 5/1947 | Lacey et al. | 252—188.3 |
| 2,977,320 | 3/1961 | Jenkins | 252—301.3 |
| 3,245,758 | 4/1966 | Benzinger et al. | 23—253 XR |
| 3,271,113 | 9/1966 | Van Pul | 23—232 XR |
| 3,285,703 | 11/1966 | Narita et al. | 23—254 |
| 3,287,089 | 11/1966 | Wilburn | 23—254 |
| 3,325,417 | 6/1967 | Rauhut | 252—188.3 |
| 3,352,791 | 11/1967 | Sheehan | 252—301.3 XR |
| 3,360,473 | 12/1967 | Winberg | 252—188.3 |
| 3,400,080 | 9/1968 | Maulding | 252—188.3 |

MORRIS O. WOLK, Primary Examiner

R. E. SERWIN, Assistant Examiner

U.S. Cl. X.R.

252—188.3, 301.3